United States Patent [19]

Hille et al.

[11] Patent Number: 4,914,148
[45] Date of Patent: Apr. 3, 1990

[54] WATER-DILUTABLE COATING AGENT FOR PREPARING THE BASE LAYER OF A MULTILAYER COATING

[75] Inventors: Hans-Dieter Hille, Bergisch Gladbach; Franz Ebner, Kist; Hermann-Josef Drexler, Greven, all of Fed. Rep. of Germany

[73] Assignee: BASF Lacke & Farben AG, Munster, Fed. Rep. of Germany

[21] Appl. No.: 276,455

[22] PCT Filed: Dec. 11, 1986

[86] PCT No.: PCT/EP86/00736
§ 371 Date: Aug. 22, 1988
§ 102(e) Date: Aug. 22, 1988

[87] PCT Pub. No.: WO87/03829
PCT Pub. Date: Jul. 2, 1987

[30] Foreign Application Priority Data

Dec. 21, 1985 [DE] Fed. Rep. of Germany ....... 3545618

[51] Int. Cl.$^4$ ............................................. C08L 75/04
[52] U.S. Cl. .................................... 524/507; 524/539; 524/542; 524/591; 427/385.5; 428/423.1; 428/425.8
[58] Field of Search ............... 524/507, 539, 542, 591; 427/385.5, 388.4; 428/423.1, 425.8

[56] References Cited

U.S. PATENT DOCUMENTS 3,438,940  4/1969  Keberle et al. ..................... 260/67

*Primary Examiner*—Maurice J. Welsh
*Attorney, Agent, or Firm*—Kenyon & Kenyon

[57] ABSTRACT

Basecoating compositions for preparing multilayered protective and/or decorative coatings comprise aqueous dispersions which contain (a) as film-forming material one or more polyurethane resins having an acid number of from 5 to 70, which has been prepared by preparing from
 (A) liner polyetherdiols and/or polyesterdiols having a molecular weight of from 400 to 3,000
 (B) diisocyanates and
 (C) compounds which contain two groups which are reactive toward isocyanate groups, one or more of the compounds used as component C having one or more groups capable of anion formation which have preferably been neutralized before the reaction with a tertiary amine, an intermediate which as terminal isocyanate groups and whose free isocyanate groups have subsequently been reacted with a polyol which contains three or more hydroxyl groups, preferably a triol, (b) pigments and
(c) further customary additives.

23 Claims, No Drawings

WATER-DILUTABLE COATING AGENT FOR PREPARING THE BASE LAYER OF A MULTILAYER COATING

The invention relates to a basecoating composition for preparing multilayered, protective and/or decorative coatings on substrate surfaces,
comprising an aqueous dispersion which contains
(a) as film-forming material one or more polyurethane resins having an acid number of from 5 to 70, which has been prepared by preparing from
   (A) Linear polyetherdiols and/or polyesterdiols having a molecular weight of from 400 to 3,000
   (B) diisocyanates and
   (C) compounds which contain two groups which are reactive toward isocyanate groups, one or more of the compounds used as component C having one or more groups capable of anion formation which have preferably been neutralized before the reaction with a tertiary amine,
an intermediate which has terminal isocyanate groups and whose free isocyanate groups have subsequently been reacted with
   (D) further compounds which contain groups reactive toward isocyanate groups,
(b) pigments and
(c) further customary additives.

It is known in particular in automotive coating but also in other areas where coatings of pleasing decorative effect and at the same time high corrosion inhibition are desirable to provide substrates with a plurality of superposed coating layers.

Multilayer coatings are preferably applied by the basecoat-clearcoat process, wherein a pigmented basecoat is applied first and, after a short flashoff time, is overpainted wet-on-wet (i.e. without prior baking) with clearcoat. Basecoat and clearcoat are subsequently baked together.

The basecoat-clearcoat process has attained particularly great importance in the application of automotive metallic effect coatings.

Economic and ecological reasons were behind attempts to use waterborne basecoating compositions in the preparation of multilayer coatings.

Coating agents for preparing basecoats for multilayer automotive coatings must be processable by the currently customary efficient wet-on-wet process, i.e. they must be overcoatable after a very short predrying time with a (transparent) topcoat without showing unwanted signs of redissolving.

In the development of coating agents for basecoats of metallic effect coatings, it is additionally necessary to solve other problems. The metallic effect depends crucially on the orientation of the metal pigment particles in the paint film. A metallic effect basecoat which is processable wet-on-wet must accordingly produce paint films in which the metal pigments are present after application in a favorable spatial orientation and in which this orientation is rapidly fixed in such a way that it cannot be disturbed in the course of the rest of the coating process.

In the development of water-dilutable systems which are to meet the requirements described above, difficult problems arise due to the special physical properties of water, and to date there exist only few water-dilutable coating systems which can be used as baecoating compositions in the abovementioned sense.

For instance, U.S. Pat. No. 4,558,090 discloses coating agents for preparing the base layer of multilayer coatings, which comprise an aqueous dispersion of a polyurethane resin having an acid number of 5–70. The aqueous polyurethane dispersion which, in addition to the binder, may also contain pigments and customary additives and if desired further binder components is prepared by reacting
(A) a linear polyetherdiol and/or polyesterdiol having terminal hydroxyl groups and a molecular weight of from 400 to 3,000 with
(B) a diisocyanate and
(C) a compound which has two groups which are reactive toward isocyanate groups and one or more groups capable of anion formation, the group capable of anion formation having been neutralized before the reaction with a tertiary amine,
to give an intermediate having the terminal isocyanate groups, converting the intermediate contained (sic) from (A), (B) and (C) into a predominantly aqueous phase and
(D) reacting the isocyanate groups still present with a di- and/or polyamine having primary and/or secondary amino groups.

The coating agents disclosed in U.S. Pat. No. 4,558,090 are highly suitable for preparing the base layer of multilayer coatings, but they are unsuitable for practical use, in particular in mass production coating processes, since the rapidly drying coating agents are so highly adherent to the application equipment used (for example paint spray guns; automatic, electrostatically aided high-rotation units and the like) that they can only be removed with great difficulty. As a consequence, it is impossible to change the applied coating systems, for example to change the color, with the high speed which is very frequently required in particular in automotive mass production coating.

It is an object of the present invention to develop aqueous dispersions which can be used as basecoating compositions for preparing multilayered protective and/or decorative coatings on substrate surfaces and which meet all the abovementioned requirements of a basecoating composition and can also be processed without problems in the application equipment used.

We have found that, surprisingly, this object is achieved by using aqueous dispersions as defined in the first part of claim 1, wherein the polyurethane resin has been prepared by reacting the intermediate obtained from (A), (B) and (C) with a polyol, preferably a triol, which contains three or more hydroxyl groups, and converting the reaction product thus obtained into the aqueous phase.

It is surprising and was not foreseeable that the difficulties in the removal of paint residues in the application equipment due to inherently desirable properties (rapid drying of the applied wet film, difficult redissolving of the dried film) can be solved by using the aqueous polyurethane dispersion according to the invention and that no decrement in the quality of the completed multilayer coating need be incurred.

The dispersions according to the invention are obtained by reacting components (A), (B) and (C) to give an intermediate which has terminal isocyanate groups. The reaction of components (A), (B) and (C) takes place in the conventional manner of organic chemistry, preferably in stages (for example formation of a first intermediate from components (A) and (B), which is then reacted with (C) to give a second intermediate). But it is also possible to react components (A), (B) and (C) simultaneously.

The reaction is preferably carried out in solvents which are inert toward isocyanate groups and water-miscible. It is advantageous to use solvents which, in addition to having the properties described above, are also good dissolvers for the polyurethanes prepared and can be easily separated from aqueous mixtures. Particularly highly suitable solvents are acetone and methyl ethyl ketone.

Component (A) can in principle be any diol customary in the preparation of polyurethane-based coating agents. Suitable polyether diols conform to the general formula:

where R is hydrogen or lower alkyl with or without various substituents, n is 2–6 and m is 10–50 or higher. Examples are poly(oxytetramethylene) glycols, poly(oxyethylene) glycols and poly(oxypropylene) glycols.

The preferred polyalkylene ether polyols are poly(oxypropylene) glycols having a molecular weight within the range from 400 to 3,000.

Polyesterdiols can likewise be used as polymeric diol component (component A) in the invention. The polyesterdiols can be prepared by esterifying organic dicarboxylic acids or the anhydrides thereof with organic diols. The dicarboxylic acids and the diols can be aliphatic or aromatic dicarboxylic acids and diols.

The diols used for preparing the polyesters include alkylene glycols such as ethylene glycol, butylene glycol, neopentylglycol and other glycols such as dimethylolcyclohexane.

The acid component of the polyester chiefly comprises low molecular weight dicarboxylic acids or anhydrides thereof of 2 to 18 carbon atoms in the molecule.

Suitable acids are for example phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid and tetrachlorophthalic acid. In place of these acids it is also possible to use their anhydrides, provided they exist.

Furthermore, in the invention it is also possible to use polyesterdiols which are derived from lactones as component (A). These products are obtained for example by reacting an ε-caprolactone with a diol. Products of this type are described in U.S. Pat. No. 3,169,945.

The polylactonepolyols which are obtained by this reaction have a terminal hydroxyl group and recurring polyester portions which are derived from the lactone. These recurring molecular portions can conform to the formula

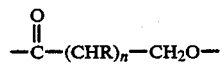

where n is preferably 4 to 6 and the substituent is hydrogen, alkyl, cycloalkyl or alkoxy, no substituent containing more than 12 carbon atoms and the total number of carbon atoms in the substituent on the lactone ring not exceeding 12.

The lactone used as starting material can be any desired lactone or any desired combination of lactones, although this lactone should contain not less than 6 carbon atoms in the ring, for example from 6 to 8 carbon atoms, and not less than 2 hydrogen substituents should be present on the carbon atom which is bonded to the oxygen group of the ring. The lactone used as starting material can be represented by the following general formula:

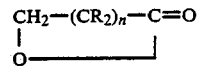

where n and R have the previously mentioned meanings.

The lactones preferred in the invention for the preparation of the polyesterdiols are the caprolactones, where n is 4. The most preferable lactone is the unsubstituted ε-caprolactone, where n is 4 and all R substituents are hydrogen. This lactone is particularly preferred since it is available in large quantities and produces coatings having excellent properties. It is also possible to use various other lactones individually or in combination.

Examples of aliphatic diols suitable for the reaction with the lactone include ethylene glycol, 1,3-propanediol, 1,4-butanediol and dimethylolcyclohexane.

Component (B) for the preparation of the polyurethane dispersion can be any desired organic diisocyanate. Examples of suitable diisocyanates are trimethylene diisocyanate, tetramethylene diisocyanate, pentamethylene diisocyanate, hexamethylene diisocyanate, propylene diissocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexene.

Component (C) comprises compounds which contain two groups reactive towards isocyanate groups, one or more of the compounds used as component (C) having one or more groups capable of anion formation which have preferably been neutralized before the reaction with a tertiary amine.

By setting a certain mixing ratio between the compounds which contain groups capable of anion formation and the compounds which are free of these groups it is possible to control the proportion of ionic groups in the polyurethane molecule.

Suitable groups which react with isocyanate groups are in particular hydroxyl groups. The use of compounds which contain primary or secondary amino groups can have an adverse effect on the above-described processability of the dispersions. The nature and amount of any amino-containing compounds to be used can be determined by the skilled worker by means of simple routine studies.

Suitable groups capable of anion formation are in particular carboxyl and sulfone groups. These groups can be neutralized before the reaction with a tertiary amine to avoid any reaction with the isocyanate groups.

Examples of compounds which contain two or more groups which react with isocyanate groups and one or more groups capable of anion formation are dihydroxypropionic acid, dimethylolpropionic acid, dihydroxysuccinic acid and dihydroxybenzoic acid. Also suitable are polyhydroxy acids accessible by oxidation of monosaccharides, for example gluconic acid, saccharic acid, mucic acid, glucuronic acid and the like. Amino-containing compounds are for example α, -diaminovaleric acid, 3,4-diaminobenzoic acid, 2,4-diaminotoluene-5-sulfonic acid, 4,4'-diaminodiphenyl ether sulfonic acid and the like.

Suitable tertiary amines for neutralizing anionic groups are for example trimethylamine, triethylamine, dimethylaniline, diethylaniline, triphenylamine and the like.

Compounds which have two groups which are reactive toward isocyanate groups but are free of groups capable of anion formation can be for example low molecular weight diols or diamines having primary or secondary amino groups.

The isocyanato-containing intermediate formed from (A), (B) and (C) is reacted with the polyol which contains three or more hydroxyl groups, the consequence of which is most probably a chain lengthening and possibly even a branching of the binder molecule.

In this reaction care must be taken to ensure that no crosslinked products are obtained. This can be achieved for example by adding an amount of polyol adapted to the isocyanate group content of the intermediate from (A), (B) and (C) and to the reaction conditions.

In principle, any polyol which contains three or more hydroxyl groups and can be reacted with the intermediate obtained from (A), (B) and (C) in such a way as to form no crosslinked products is suitable for preparing the polyurethane dispersion according to the invention. Examples are trimethylolpropane, glycerol, erythritol, mesoerythritol, arabitol, adonitol, xylitol, mannitol, sorbitol, dulcitol, hexanetriol, (poly)pentaerythritol and the like.

Very particularly good results can be obtained when using trimethylolpropane as the polyol.

It is also conceivable that by reacting all the four components, namely (A), (B), (C) and polyol, simultaneously it is possible to prepare uncrosslinked polyurethanes which can be processed to give usable basecoating compositions.

After reaction of the intermediate obtained from (A), (B) and (C) with the polyol component, which has preferably been carried out in a water-miscible solvent which is inert toward isocyanate groups, which is a good solvent for the polyurethane formed and which is readily separable from aqueous mixtures, for example acetone or methyl ethyl ketone, and, if still to be carried out, neutralizing the groups capable of anion formation, the reaction product is converted into an aqueous phase. This can be done for example by dispersing the reaction mixture in water and distilling off the organic solvent portions which boil below 100° C.

For the purposes of the present invention, aqueous phase is water which can additionally contain organic solvents. Examples of solvents which can be present in the water are heterocyclic, aliphatic or aromatic hydrocarbons, monohydric or polyhydric alcohols, ethers, esters and ketones, for example N-methylpyrrolidone, toluene, xylene, butanol, ethylglycol and butylglycol and acetates thereof, butyldiglycol, ethylene glycol dibutyl ether, ethylene glycol diethyl ether, diethylene glycol dimethyl ether, cyclohexanone, methyl ethyl ketone, acetone, isophorone or mixtures thereof.

After the pH of the resulting polyurethane dispersion has been checked and if necessary been adjusted to a value within the range from 6 to 9, the dispersion forms the basis of the coating agents according to the invention into which the other constituents, for example additional binders, pigments, organic solvents and assistants, are homogeneously incorporated by dispersing, for example by means of a stirrer or dissolver. Thereafter the pH is checked again and if necessary adjusted to a value within the range from 6 to 9, preferably from 7.0 to 8.5. Also the solids content and the viscosity are set to values adapted to the particular application conditions.

The ready-to-use coating agents generally have a solids content of from 10 to 30% by weight, and their efflux time in the ISO cup 4 is from 15 to 30 seconds, preferably from 18 to 25 seconds. Their water content is from 60 to 90% by weight, and their organic solvent content from 0 to 20% by weight, in each case based on the total coating agent.

The advantageous actions of the coating compositions according to the invention can be ascribed to the use of the aqueous polyurethane dispersion described above.

In many cases it is desirable to improve the properties of the resulting surface coatings in a controlled manner by including further binder systems in the basecoating composition.

The basecoating compositions according to the invention advantageously contain as additional binder component a water-dilutable melamine resin in an amount of from 1 to 80% by weight, preferably from 20 to 60% by weight, based on the solids content of the polyurethane dispersion.

Water-soluble melamine resins are known per se and are widely used. They are etherified melamine-formaldehyde condensation products. Their water solubility depends not only on the degree of condensation, which should be as low as possible, but also on the etherification component, only the lowest members of the alkanol or ethylene glycol monoether series giving water-soluble condensates. The hexamethoxymethyl-melamine resins are of the greatest importance. If solubilizers are used, even butanol-etherified melamine resins can be dispersed in the aqueous phase.

It is also possible to incorporate carboxyl groups in the condensate. Transetherification products of highly etherified formaldehyde condensates with hydroxycarboxylic acids are water-soluble after neutralization on account of their carboxyl group and can be used as crosslinker component in the coating agents according to the invention.

In place of the melamine resins described it is also possible to use other water-soluble or water-dispersible amino resins, for example benzoguanamine resins.

When the basecoating composition according to the invention contains a melamine resin, it can advantageously additionally contain, as a further binder component, a water-dilutable polyester resin and/or a water-dilutable polyacrylate resin, the weight ratio of melamine resin: polyester/polyacrylate resin being from 2:1 to 1:4 and the total amount of melamine resin and polyester/polyacrylate resin, based on the solids content of the polyurethane dispersion, ranging from 1 to 80% by weight, preferably from 20 to 60% by weight.

Water-dilutable polyesters are those having free carboxyl groups, i.e. polyesters of high acid number.

There are in principle two known methods for incorporating the necessary carboxyl groups in the resin system. The first method comprises terminating the esterification at the desired acid number. After neutralization with bases, the polyesters thus obtained are soluble in water and undergo film formation in the course of baking. The second method comprises forming partial esters of dicarboxylic or polycarboxylic acids with high-hydroxyl polyesters of low acid number. This reaction is customarily carried out with the dicarboxylic acids in anhydride form, which reacts under mild conditions with the hydroxyl component by forming a free carboxyl group.

The water-dilutable polyacrylate resins, like the polyester resins described above, contain free carboxyl groups. They generally comprise acrylic or methacrylic copolymers, and the carboxyl groups come from the acrylic or methacrylic acid portions.

Suitable crosslinking agents include blocked polyisocyanates. According to the invention, it is possible to use any desired polyisocyanate where the isocyanate groups have been reacted with a compound so that the blocked polyisocyanate formed is resistant to hydroxyl groups at room temperatures but reacts at elevated temperatures, in general within the range from about 90° to 300° C. In the preparation of the blocked polyisocyanates it is possible to use any desired organic polyisocyanates which are suitable for the crosslinking. Preference is given to those isocyanates which contain from about 3 to about 36, in particular from about 8 to 15, carbon atoms. Examples of suitable diisocyanates are the abovementioned diisocyanates (component B).

It is also possible to use polyisocyanates of higher isocyantes functionality. Examples thereof are tris(4-isocyanatophenyl)methane, 1,3,5-triioscyanatobenzene, 2,4,6-triisocyanatotoluene, 1,3,5-tris(6-isocyanatohexyl)biuret, bis(2,5-diisocyanato-4-methylphenyl)methane and polymeric polyisocyanates, such as dimers and trimers of diisocyanatotoluene. It is also possible to use mixture of polyisocyanates.

The organic polyisocyanates which are suitable for use as crosslinking agents in the invention can be prepolymers which are derived for example from a polyol, including a polyetherpolyol or a polyesterpolyol. To this end it is known to react polyols with excess polyisocyanates to form prepolymers having terminal isocyanate groups. Examples of polyols which can be used for this purpose are simple polyols, such as glycols, for example ethylene glycol and propylene glycol, and other polyols, such as glycerol, trimethylolpropane, hexanetriol and pentaerythritol, furthermore monoethers, such as diethylene glycol and dipropylene glycol, as well as polyethers which are adducts of such polyols and alkylene oxides. Examples of alkylene oxides which are suitable for polyaddition onto these polyols to form polyethers are ethylene oxide, propylene oxide, butylene oxide and styrene oxide. These polyaddition products are generally referred to as polyethers having terminal hydroxyl groups. They can be linear or branched. Examples of such polyethers are polyoxyethylene glycol having a molecular weight of 1,540, polyoxypropylene glycol having a molecular weight of 1,025, polyoxytetramethylene glycol, polyoxyhexamethylene glycol, polyoxynonamethylene glycol, polyoxydecamethylene glycol, polyoxydodecamethylene glycol and mixtures therof. Other types of polyoxyalkylene glycol ethers can likewise be used. Particularly suitable polyether polyols are those which are obtained by reacting such polyols as ethylene glycol, diethylene glycol, triethylene glycol, 1,4-butanediol, 1,3-butanediol, 1,6-hexanediol and mixtures thereof, glyceroltrimethylolethane, trimethylolpropane, 1,2,6-hexanetriol, dipentaerythritol, tripentaerythritol, polypentaerythritol, methylglucosides and sucrose with alkylene oxides, such as ethylene oxide, propylene oxide or mixtures thereof.

To block the polyisocyanates it is possible to use any desired suitable aliphatic, cycloaliphatic or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl and lauryl alcohol, aromatic alkyl alcohols, such as phenylcarbinol and methylphenylcarbinol. It is also possible to include small amounts of higher molecular weight and relatively involatile monoalcohols, if desired, these alcohols, after detachment, functioning as plasticizers in the coatings. Other suitable blocking agents are oximes, such as methyl ethyl ketone oxime, acetone oxime and cyclohexanone oxime, as well as caprolactams, phenols and hydroxamic acid esters. Preferred blocking agents are malonic esters, acetoacetic esters and β-diketones.

The blocked polyisocyanates are prepared by reacting a sufficient amount of an alcohol with the organic polyisocyanate, so that no free isocyanate groups are present.

The basecoating compositions according to the invention may contain any known pigment or dye customary in the paint industry.

Examples of dyes and pigments which may be of inorganic or organic nature are titanium dioxide, graphite, carbon black, zinc chromate, strontium chromate, barium chromate, lead chromate, lead cyanamide, lead silicochromate, zinc oxide, cadmium sulfide, chromium oxide, zinc sulfide, nickel titanic yellow, chromium titanic yellow, iron oxide red, iron oxide black, ultramarine blue, phthalocyanine complexes, naphthol red, quinacridones, halogenated thioindigo pigments.or the like.

Particularly preferred pigments are metal powders alone or a mixture, such as copper, copper alloys, aluminum and steel, preferably aluminum powder, used in an not less than predominant amount, namely in an amount of from 0.5 to 25% by weight, based on the total solids content of binders in the coating agents. Preferred metallic pigments are those commercially available metal powders which have been specifically pretreated for aqueous systems.

The metal powders can also be used together with one or more of the abovementioned non-metallic pigments or dyes. In this case, the amount thereof is chosen in such a way that the desired metallic effect is not suppressed.

The basecoating compositions according to the invention can also contain further customary additives such as solvents, fillers, plasticizers, stabilizers, wetting agents, dispersants, flow control agents, antifoams and catalysts individually or in mixture in the customary amounts. These substances can be added to the individual components and/or to the mixture as a whole.

Examples of suitable fillers are talcum, mica, kaolin, chalk, quartz powder, asbestos powder, slate powder, barium sulfate, various silicas, silicates, glass fibers, organic fibers and the like.

The coating compositions described above are used according to the invention in processes for preparing multilayered coatings on substrate surfaces, wherein (1) an aqueous dispersion is applied as a basecoating composition
(2) from which a polymer film is formed on the substrate surface
(3) to the basecoat thus obtained is applied a suitable transparent topcoat composition and subsequently
(4) the basecoat is baked together with the topcoat.

Suitable topcoat compositions are in principle all known nonpigmented or merely transparently pigmented coating agents. They may be conventional solvent-containing clearcoats, water-dilutable clearcoats or powder clearcoats.

Suitable substrates to be coated are in particular pretreated metal substrates, but it is also possible to coat the nonpretreated metals and any other desired substrates such as, for example, wood, plastics and the like with a multilayered protective and/or decorative coating using the basecoating compositions according to the invention.

The invention is explained in more detail in the following examples. Parts and percentages are by weight, unless otherwise stated.

Preparation of a Polyurethane Dispersion According to the Invention 255 g of a polyester of 1,6-hexanediol and isophthalic acid with an average molecular weight of 614 are heated together with 248 g of polypropylene glycol having an average molecular weight of 600 and 100 g of dimethylpropionic acid to 100° C. and dehydrated for 1 hour under reduced pressure. At 80° C. 526 g of 4,4'-dicyclohexylmethane diisocyanate and 480 g of methyl ethyl ketone are added. Stirring is continued at 80° C. until the free isocyanate group content is 1.69%, based on the total starting weight.

28.5 g of trimethylolpropane are then added, followed by 0.4 g of dibutyltin dilaurate, and 2 hours of stirring at 80° C. After addition of 1,590 g of methyl ethyl ketone the temperature of 80° C. is maintained until the viscosity, measured in the DIN cup, is 65 s (sample dissolved in a ratio of 2:3 in N-methylpyrrolidone).

After addition of a mixture of 22.4 g of dimethylethanolamine and 2,650 g of deionized water, methyl ethyl ketone is distilled off under reduced pressure, to leave a finely divided dispersion having a solids content of 30%, a pH of 7.4 and a viscosity of 48 s, measured in the DIN cup.

Preparation of Two-Layer Coatings by the Basecoat/Clearcoat Method Using the Polyurethane Dispersion According to the Invention Prepared by the Above Method The two-layer coating was prepared in accordance with the experimental directions given in U.S. Pat. No. 4,558,090.

It proved possible to process a metallic effect basecoat prepared using the polyurethane dispersion according to the invention into a high-quality two-layer metallic effect coating giving an excellent metallic effect.

The removability of paint residues remaining behind in the application equipment is demonstrated by means of the following comparative experiment: A glass plate was knife-coated in a wet film thickness of 100 μm with a metallic effect basecoat in accordance with U.S. Pat. No. 4,558,090 and a metallic effect basecoat in accordance with the present invention.

After 2 hours of drying at room temperature a mixture of 50 parts of water and 50 parts of n-propanol was used to try to remove the dried paint film from the glass plate by guiding under slight pressure a brush which had been impregnated with this cleaning mixture in circular movements over the dried paint film. The paint film formed from the metallic effect basecoat prepared according to the invention dissolved homogeneously after the first few circular movements. The paint film prepared using the dispersion disclosed in U.S. Pat. No. 4,558,090, by contrast, first became swollen and only became detached from the substrate in relatively large connected flakes after many circular movements.

This experiment was repeated with a large number of different solvent and solvent mixtures. Similar results were obtained in all cases.

We claim:

1. A basecoating composition for preparing a multi-layered, protective or decorative coating, comprising an aqueous dispersion which contains:
   (a) as a film-forming material a polyurethane resin having an acid number of from 5 to 70, which has been prepared from
      (A) linear polyetherdiol or polyesterdiol having a molecular weight of from 400 to 3,000,
      (B) diisocyanate and
      (C) a compound which contains two groups which are reactive toward isocyanate groups,
   component C having one or more groups capable of anion formation which have preferably been neutralized before the reaction with a tertiary amine, and components (A), (B) and (C) forming an intermediate which has terminal isocyanate groups and whose free isocyanate groups have subsequently been reacted with
      (D) further compounds which contain groups reactive toward isocyanate groups, and
   (b) pigments,
wherein the aqueous polyurethane dispersion has been prepared by (1) reacting the intermediate obtained from (A), (B) and (C) with a polyol which contains three or more hydroxyl groups and (2) transferring the reaction product thus obtained into an aqueous phase.

2. A process for preparing a multi-layered, protective or decorative coating on a substrate surface comprising:
   (1) applying as a basecoating composition an aqueous dispersion which contains
      (a) a film-forming polyurethane resin having an acid number of from 5 to 70, which has been prepared from
         (A) linear polyetherdiol or polyesterdiol having a molecular weight of from 400 to 3,000,
         (B) diisocyanate, and
         (C) a compound which contains two groups which are reactive toward isocyanate groups, component C having one or more groups capable of anion formation which have preferably been neutralized before the reaction with a tertiary amine, components (A), (B) and (C) forming an intermediate which has terminal isocyanate groups and whose free isocyanate groups have subsequently been reacted with
         (D) a compound which contains groups reactive toward isocyanate groups, and
      (b) pigments;

(2) forming from the composition applied in stage (1) a polymer film on the surface;
(3) applying to the basecoat thus obtained a suitable transparent topcoat composition, and
(4) baking the basecoat together with the topcoat, wherein the polyurethane dispersion forming the basecoating composition has been prepared by reacting the intermediate obtained from (A), (B) and (C) with a polyol which contains three or more hydroxyl groups.

3. A basecoating composition as described in claim 1 wherein the reaction of the intermediate obtained from (A), (B) and (C) with the polyol has been carried out in a water-miscible organic solvent which boils below 100° C., is inert toward isocyanate groups and is readily separable from aqueous mixtures.

4. A basecoating composition as described in claim 1 wherein the intermediate obtained from (A), (B) and (C) has been reacted with trimethylolpropane.

5. A basecoating composition as described in claim 1 wherein the basecoating composition contains as a binder component a water-dilutable melamine resin in an amount from 1 to 80% by weight, based on the solids content of the polyurethane dispersion.

6. A basecoating composition as described in claim 5 wherein the basecoating composition contains as a further binder component a water-dilutable polyester resin or a water-dilutable polyacrylate resin, the weight ratio of melamine resin: polyester resin or polyacrylate resin being from 2:1 to 1:4 and the total proportion of melamine resin, polyester resin and polyacrylate resin, based on the solids content of the polyurethane dispersion, ranging from 1 to 80% by weight.

7. A basecoating composition as described in claim 1 wherein the basecoating composition contains as a binder component a blocked polyisocyanate together with a water-dilutable polyester resin or a water-dilutable polyacrylate resin, the proportion of polyisocyanate, polyester resin or polyacrylate resin as a whole ranging from 1 to 80% by weight, based on the solids content of the polyurethane dispersion.

8. A basecoating composition as described in claim 1 wherein the basecoating composition contains metal pigments in an amount ranging from 0.5 to 25% by weight, based on the total solids content of the polyurethane dispersion.

9. A substrate coated with a multi-layered, protective or decorative coating which has been obtained by
(1) applying as a basecoating composition an aqueous dispersion which contains
(a) as a film-forming material one or more polyurethane resins having an acid number of from 5 to 70, which has been prepared from
(A) linear polyetherdiol or polyesterdiol having a molecular weight of from 400 to 3,000;
(B) diisocyanate, and
(C) a compound which contains two groups which are reactive toward isocyanate groups, component C having one or more groups capable of anion formation which have preferably been neutralized before the reaction with a tertiary amine, components (A), (B) and (C) forming an intermediate which has terminal isocyanate groups and whose free isocyanate groups have subsequently been reacted with
(D) further compounds which contain groups reactive toward isocyanate groups, and
(b) pigments;

(2) forming from the composition applied in (1) a polymer film on the surface;
(3) applying to the basecoat thus obtained a suitable transparent topcoat composition, and
(4) baking the basecoat together with the topcoat, wherein the polyurethane dispersion forming the basecoating composition has been prepared by reacting the intermediate obtained from (A), (B) and (C) with a polyol which contains three or more hydroxyl groups and transferring the reaction product thus obtained into an aqueous phase.

10. The basecoating composition of claim 1 wherein the polyol which contains three or more hydroxyl groups is a triol.

11. The process of claim 2 wherein the polyol which contains three or more hydroxyl groups is a triol.

12. The basecoating composition of claim 3 wherein the water-miscible organic solvent is acetone.

13. The process of claim 2 wherein the intermediate obtained by reacting (A), (B) and (C) with the polyol is carried out in a water-miscible organic solvent which boils below 100° C., is inert toward isocyanate groups and is readily separable from aqueous mixtures.

14. The process of claim 13 wherein the water-miscible organic solvent is acetone.

15. The process of claim 2 wherein the intermediate obtained from (A), (B) and (C) is reacted with trimethylolpropane.

16. The process of claim 2 further comprising adding to the basecoating composition a binder component comprised of a water dilutable melamine resin in an amount ranging from 1 to 80% by weight, based on the solids content of the polyurethane dispersion.

17. The process of claim 16 where the water dilutable melamine resin is present in an amount ranging from 20 to 60% by weight.

18. A basecoating composition as described in claim 5 wherein the melamine resin is present in an amount ranging from 20 to 60% by weight, based on the solids content of the polyurethane resin.

19. A process as described in claim 16 further comprising adding to the basecoating composition a water-dilutable polyester resin or a water-dilutable polyacrylate resin, the weight ratio of melamine resin: polyester resin or polyacrylate resin being from 2:1 to 1:4, and the total proportion of melamine resin, polyester resin and polyacrylate resin, ranging from 1 to 80% by weight based on the solids contents of the polyurethane dispersion.

20. A process as described in claim 19 wherein the total proportion of melamine resin, polyester resin and polyacrylate resin ranges from 20 to 60% by weight based on the solids content of the polyurethane dispersion.

21. A basecoating composition as described in claim 6 wherein the total proportion of melamine resin, polyester resin and polyacrylate resin ranges from 20 to 60% by weight, based on the solids content of the polyurethane dispersion.

22. The process described in claim 2 further comprising adding a blocked polyisocyanate together with a water dilutable polyester resin or polyacrylate resin, the proportion of polyisocyanate, polyester resin or polyacrylate resin, ranging from 1 to 80% by weight, based on the solids content of the polyurethane dispersion.

23. The process described in claim 2 wherein the basecoating composition contains metal pigment in an amount ranging from 0.5 to 25% by weight, based on the total solids content of the polyurethane dispersion.

* * * * *